Dec. 8, 1964  R. A. NEISH  3,160,532
METHOD OF FORMING A PROTECTIVE COATING
Filed June 13, 1962
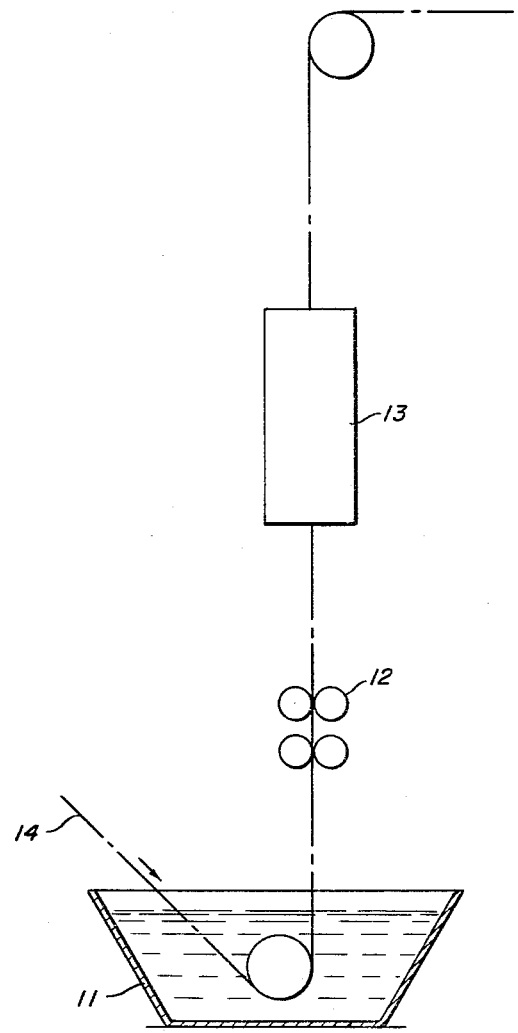
INVENTOR
RICHARD A. NEISH
By Donald G. Dalton
Attorney

United States Patent Office 3,160,532
Patented Dec. 8, 1964

3,160,532
METHOD OF FORMING A PROTECTIVE COATING
Richard A. Neish, Snowden Township, Allegheny County, Pa., assignor to United States Steel Corporation, a corporation of New Jersey
Filed June 13, 1962, Ser. No. 202,099
1 Claim. (Cl. 148—6.16)

This invention relates to a process for forming a protective chemical coating, particularly on metal surfaces such as steel, aluminum or zinc, but also on non-metallic surfaces as well, and especially to a process whereby these coatings are produced using a very rapid curing procedure, which will hereafter be referred to as "flash curing."

This is a continuation-in-part of my copending application Serial No. 858,606, filed December 10, 1959.

Numerous methods are known for producing a chemical coating on metal surfaces. It is the object of my invention to improve on such methods, and more specifically, to provide a coating which is easily applied, durable and strongly resistant to corrosion of the base, if of metal.

Generally speaking, my method includes coating the surface of the basis material with a predetermined amount of a solution containing phosphate and hexavalent chromium ions in a predetermined ratio, and then polymerizing the solution film to form a highly protective and adherent coating by means of a rapid, almost instantaneous cure. I am aware that it has been proposed heretofore to form protective coatings by treatment with solutions containing phosphate and hexavalent chromium ions, but the curing cycles used in these processes are so long that the processes are not feasible for the commercial treating of continuous strip. I have discovered, however, that (1) when a solution is used containing phosphate and chromate ions wherein the ratio of phosphate to chromium ions, expressed as concentrations of orthophosphoric acid and chromic-acid anhydride, is between 0.5 and 3.0 and preferably between 1.0 and 2.0, and (2) when a film of such solution is uniformly distributed over the surface of the strip so as to obtain a final coating weight of 25 to 125 mg./sq. ft. of surface, then the solution film may be flash cured and polymerized into permanent form by merely heating to a temperature of 300 to 625° F. for from 3 to 8 seconds. The optimum temperature for flash curing is determined in each case by the use of a simple but effective test, as hereinafter described.

A complete understanding of the invention may be obtained from the following detailed description and the accompanying explanation which refer to the diagrammatic illustration in the accompanying drawing.

I prepare an aqueous solution containing from 7 to 45 g./l. of chromic-acid anhydride and from 0.5 to 3.0 times as much orthophosphoric acid. For example, a solution containing say 26 g./l. of chromic-acid anhydride will also contain 13 to 78 g./l. of orthophosphoric acid, preferably 26 to 52 g./l. The solution may be prepared directly from orthophosphoric acid and chromic-acid anhydride, but salts of the latter such as sodium or potassium dichromate may be substituted therefor as a source of hexavalent chromium. For optimum results, however, the total amount of sodium and potassium ion should not exceed about 10% of the total weight of the chemicals used in the solution.

To apply the coating of my invention, the part being coated, such as a steel sheet, is immersed in the solution 11 and then passed between rubber rolls 12 adjusted with respect to surface roughness and pressure to gage the film so that the final coating will weigh between 20 and 125 mg. per square foot of surface, preferably between 25 and 100 mg. Thus, when a solution containing 3 weight percent of $H_3PO_4$ and 2.5 weight percent of $Na_2Cr_2O_7 \cdot 2H_2O$ is used, a wet-film thickness of about 0.0003 inch will produce a cured coating weighing about 30 mg./sq. ft. of surface. To obtain a coating weight of about 100 mg./sq. ft. of surface, a wet-film thickness of about 0.0005 inch will be satisfactory when using a solution containing about 6 weight percent of $H_3PO_4$ and 5 weight percent of $$Na_2Cr_2O_7 \cdot 2H_2O$$

Alternatively, a film of treating solution can be applied by use of a roll machine such as is commonly used in applying an enamel or lacquer coating to strip or sheet metal. Since no reaction occurs within the solution there is no change in the effectiveness of the treating solution from one day to the next, and the need for continual analytical control and adjustment is eliminated.

The above coating procedures produce thin continuous films on clean galvanized steel or on an aluminum surface. For bare steel strip, however, it is often advisable to give the surface a preparatory treatment as by passing it through a 2 volume percent solution of $HNO_3$ at about 80° F. for ½ second and then rinse it with water before applying the chemical coating by the method described previously. Alternatively, the presently described coating can be applied over an underlying treatment; for example, that taught in my Patent No. 2,812,296.

After a film of solution has been applied to the metal base as described above, the base is heated, by passing it through a short oven 13, to a temperature from 300 to 625° F., at which temperature the solution is flash cured or polymerized into permanent form. The lighter of the two films mentioned above can be cured by heating to a temperature of 350° F. and the heavier by heating to a temperature of about 625° F. It is not necessary to hold the film at temperature for any given period of time. It is sufficient if the strip or sheet attains maximum temperature only momentarily, just before the coated metal leaves the oven. The actual oven temperature required to obtain a given surface temperature, of course, will depend on the linear speed of the metal passing through the oven, the gage of the metal and the length of the oven, but in any case, must be considerably higher than the surface temperature of the coating being cured. The finally cured coating is believed to be a solid solution, formed largely by polymerization and molecular condensation of the coating components during the heating. The coating is amorphous in character, usually hydrophobic (water will not wet it), nonhydroscopic and essentially insoluble.

The following typical example will serve to illustrate in greater detail the application of my invention to the coating of light-gage steel strip, called black plate.

Light-gauge steel strip 14 was pickled by passing through a 2 volume percent solution of $HNO_3$ (½ second at 80° F.), rinsed with water, and then coated with a film of solution 11 containing 3 weight percent of $H_3PO_4$ and 2 weight percent of $Na_2Cr_2O_7 \cdot 2H_2O$. The strip carrying the wet film of solution was then passed through oven 13 between three sets of gas burners which rapidly raised the surface temperature of the strip to 550° F. After leaving the oven, the strip passed to a drive bridle and thence to a shear, where it was cut into sheets of the desired length. The line speed was 60 f.p.m. The length of the heating unit was 4 feet. The surface temperature of the strip was thus raised to 550° F. in only 4 seconds.

The product was exposed to humid air at 100° F. and 85% relative humidity for two weeks, but no rusting thereof occurred. Untreated steel exposed to the same conditions rusted heavily within two days. When lacquered, the treated steel was formed into can ends and double-seamed onto cans without flaking of the lacquer. Because of its superior resistance to corrosion, steel treated by my method is suitable for many uses such as the packaging of heavy-duty detergents, which are corrosive to tin and to untreated steel and attack the protective lacquers or enamels ordinarily applied to the interior of cans.

Substantially the preferred conditions of treatment are necessary to achieve the most successful results. Thus, if the phosphoric acid content is too low, the required curing temperature may be too high to be practical. Without the phosphoric acid, the chromic acid will fume and volatilize during curing, and the final coating will have relatively poor corrosion resistance. Conversely, if the phosphoric acid content is too great, the cured coating tends to be hygroscopic. If the coating weight is less than about 20 mg./sq. ft. of surface, the coating tends to be porous, and the corrosion resistance is low. On the other hand, if the coating weight is heavier than about 125 mg./sq. ft. of surface, it is difficult, if not impossible, to cure throughout its thickness by my rapid curing procedure; that is, the coating then requires a longer curing cycle than is commercially practical.

Proper curing is essential. Undercuring leaves the coating water-soluble and hygroscopic, so that much of it can be washed off the metal surface. Furthermore, such undercured films are not satisfactory as a base for the application of enamels and lacquers. On the other hand, if the films are overcured, their porosity appears to be adversely affected, and their ability to impart corrosion resistance is impaired.

In view of the importance of proper curing as discussed in the foregoing, at first thought it would appear almost impossible to control a rapid "flash cure." This is particularly so in view of the effects of variations in the coating solution, differences in film thickness, and differences in line speed. I have found, however, that the curing step is easily controlled. I wet the finished product with water and observe the hydrophobic or hydrophilic nature of the coating and adjust the curing temperature accordingly. To accomplish this, the furnace temperature is increased stepwise until the finished product, which is originally hydrophilic and water-soluble, exhibits a water-break when water is flooded over the surface. The curing temperature (maximum surface temperature) is then raised 50 to 100° F. above this minimum value. Although the product may then appear to be overcured, in that it may wet with water, coatings cured in this way revert to a hydrophobic condition within a few days after production. In pilot-line runs, I have never found it necessary to heat the strip above 600° F., and the actual time necessary to achieve the proper temperature has never exceeded 8 seconds and has been as short as 3 seconds, depending upon the line speed. (The length of the curing oven remained unchanged.)

In addition to coating black plate for corrosion protection, I have applied my protective coating to galvanized steel. The protective coating formed on this material was translucent and almost colorless, having only a slight yellow cast. To test this material, a film of water was placed on the treated galvanized surface, and it was then kept wet for 60 days before any traces of white-rust appeared on the surface. Indeed after 120 days of exposure, very little white rust could be observed. In contrast, untreated galvanized steel white-rusted heavily within two days of exposure to the same test. The treated galvanized steel was also a good base for the application of enamels and paints.

I have also applied my protective coating to stainless steel and to aluminum, and even to glass plates. In each case, the same physical characteristics were obtained as on steel or galvanized steel.

It will be evident that the method of my invention is characterized by important advantages. The coating procedure is simple, and in my process the treating solution is not subject to the buildup of sludge or to the other changes which normally occur in surface treatments which depend upon reactions which occur in the solution. Also, the use of flash curing as taught herein permits the use of line speeds which have never before been attainable with a cured coating of the general type shown. The resulting film is rugged and durable so as to afford good corrosion resistance. It is also an exceptionally good base for enamel and paint.

Although I have disclosed heerin the preferred embodiment of my invention, I intend to cover as well any change or modification therein which may be made without departing from the spirit and scope of the invention.

I claim:

A method of forming a protective coating upon an article having a surface of a metal selected from the group consisting of steel, zinc and aluminum, which consists in applying to the surface a film of an aqueous solution containing hexavalent chromium ions corresponding to between 7 and 45 grams of chromic acid anhydride per liter of solution and from .5 to 3 times as much orthophosphoric acid, metering the solution over the surface to obtain a final coating weight within the range of 20 to 125 mg. per square foot of surface, then heating said surface to a temperature between 300 and 625° F. for from 3 to 8 seconds, thereby flash curing said film to provide a continuous amorphous coating.

References Cited in the file of this patent

UNITED STATES PATENTS

| | | |
|---|---|---|
| 2,030,601 | McDonald | Feb. 11, 1936 |
| 2,412,543 | Tanner | Dec. 10, 1946 |
| 2,812,296 | Neish | Nov. 5, 1957 |